(12) United States Patent
Sun et al.

(10) Patent No.: US 11,070,134 B2
(45) Date of Patent: Jul. 20, 2021

(54) CONTROL METHOD FOR DC/DC CONVERTER AND DC/DC CONVERTER

(71) Applicant: Delta Electronics (Shanghai) Co., Ltd., Shanghai (CN)

(72) Inventors: Hao Sun, Shanghai (CN); Minli Jia, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/810,876

(22) Filed: Mar. 6, 2020

(65) Prior Publication Data
US 2020/0287466 A1 Sep. 10, 2020

(30) Foreign Application Priority Data
Mar. 8, 2019 (CN) .......................... 201910176087.0

(51) Int. Cl.
*H02M 3/335* (2006.01)
*H02M 3/158* (2006.01)
(Continued)

(52) U.S. Cl.
CPC ......... *H02M 3/33546* (2013.01); *H02M 3/07* (2013.01); *H02M 3/1584* (2013.01);
(Continued)

(58) Field of Classification Search
CPC ......... H02M 3/33523; H02M 3/33576; H02M 3/33592
(Continued)

(56) References Cited

U.S. PATENT DOCUMENTS 9,287,790 B2 * 3/2016 Norisada ................. H02M 1/14
9,559,604 B2 * 1/2017 Yang ..................... H02M 3/335
(Continued)

FOREIGN PATENT DOCUMENTS

CN 104539164 A 4/2015
CN 105790626 A 7/2016
(Continued)

OTHER PUBLICATIONS

Corresponding Chinese office action dated Dec. 4, 2019.

*Primary Examiner* — Gary A Nash
(74) *Attorney, Agent, or Firm* — CKC & Partners Co., LLC

(57) ABSTRACT

A control method for a DC/DC converter and a DC/DC converter are provided. The method includes: providing a primary side driving signal to drive one or more primary side switches of the primary side circuit; providing a sixth signal, a fifth signal, a seventh signal and an eighth signal, where a phase shift angle exists between the sixth signal and the primary side driving signal, and the sixth signal, the fifth signal, the seventh signal and the eighth signal in turn have a predetermined phase difference; driving a sixth switch, a fifth switch, a seventh switch and an eighth switch according to the sixth signal, the fifth signal, the seventh signal and the eighth signal, respectively; where the switching frequency of the sixth signal, the fifth signal, the seventh signal or the eighth signal is half of the switching frequency of the primary side driving signal.

20 Claims, 17 Drawing Sheets

(51) Int. Cl.
*H02M 3/07* (2006.01)
*H02M 1/00* (2006.01)

(52) U.S. Cl.
CPC .... *H02M 3/33523* (2013.01); *H02M 3/33576* (2013.01); *H02M 3/33592* (2013.01); *H02M 2001/009* (2013.01); *H02M 2003/1586* (2013.01)

(58) Field of Classification Search
USPC ............................. 363/21.06, 21.14, 84, 88
See application file for complete search history.

(56) References Cited

U.S. PATENT DOCUMENTS

| | | | |
|---|---|---|---|
| 9,774,259 B1 | 9/2017 | Ikriannikov et al. | |
| 9,866,129 B2* | 1/2018 | Norisada | H02M 3/33546 |
| 2015/0229225 A1* | 8/2015 | Jang | H02M 3/33569 363/17 |

FOREIGN PATENT DOCUMENTS

| | | |
|---|---|---|
| CN | 106026645 A | 10/2016 |
| CN | 107370386 A | 11/2017 |
| CN | 109039079 A | 12/2018 |
| WO | 2018141092 A1 | 8/2018 |

* cited by examiner

S201 Providing the sixth signal, the fifth signal, the seventh signal and the eighth signal, wherein the switching frequency of the sixth signal, the fifth signal, the seventh signal or the eighth signal is half of the switching frequency of the primary side driving signals (S1~S4), the sixth signal, the fifth signal, the seventh signal and the eighth signal in turn have a phase-lag, and a phase shift angle exists between the sixth signal and the driving signal of the first switch SW1

S202 Implementing the sixth signal, the fifth signal, the seventh signal and the eighth signal to act as the secondary side driving signals (S6, S5, S7, S8) to drive the sixth switch SW6, the fifth switch SW5, the seventh switch SW7 and the eighth switch SW8 respectively

FIG. 5

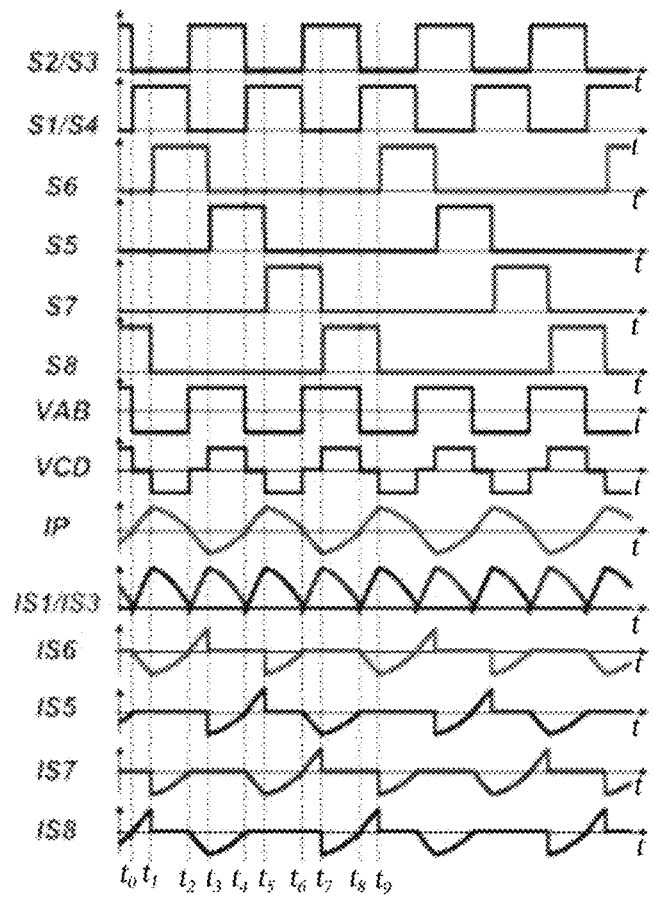

FIG. 6

Providing the sixth signal, the fifth signal, the seventh signal and the eighth signal, wherein the switching frequency of the sixth signal, the fifth signal, the seventh signal or the eighth signal is half of the switching frequency of the primary side driving signals (S1~S4), the sixth signal, the fifth signal, the seventh signal and the eighth signal in turn have a phase-lead, and a phase shift angle exists between the sixth signal and the driving signal of the first switch SW1 — S301

Implementing the sixth signal, the fifth signal, the seventh signal and the eighth signal to act as the secondary side driving signals (S6, S5, S7, S8) to drive the sixth switch SW6, the fifth switch SW5, the seventh switch SW7 and the eighth switch SW8 respectively — S302

FIG. 7

Providing the sixth signal, the fifth signal, the seventh signal and the eighth signal — S401

Implementing the sixth signal, the fifth signal, the seventh signal and the eighth signal to act as intermediate signals, and generating the secondary side driving signals (S5~S8) for operating the DC/DC converter in an asynchronous rectification state or in a synchronous rectification state through a digital computing method, and applying the generated secondary side driving signals (S5~S8) to drive the corresponding secondary side switches (SW5~SW8), respectively — S402

FIG. 9

Providing the sixth signal, the fifth signal, the seventh signal and the eighth signal — S501

Implementing the sixth signal to act as a first intermediate signal, the fifth signal to act as a second intermediate signal, the seventh signal to act as a third intermediate signal and the eighth signal to act as a fourth intermediate signal; performing logic gate operations to the intermediate signals and at least one primary side driving signal so as to generate secondary side driving signals to control the DC/DC converter to be operated in an asynchronous rectification state — S502

FIG. 10

Providing the sixth signal, the fifth signal, the seventh signal and the eighth signal — S601

Implementing the sixth signal to act as a first intermediate signal, the fifth signal to act as a second intermediate signal, the seventh signal to act as a third intermediate signal and the eighth signal to act as a fourth intermediate signal; performing logic gate operations to intermediate signals and at least one primary side driving signal so as to generate secondary side driving signals to control the DC/DC converter to be operated in a synchronous rectification state — S602

CONTROL METHOD FOR DC/DC CONVERTER AND DC/DC CONVERTER

CROSS-REFERENCE TO RELATED APPLICATION

This application claims priority to Chinese Patent Application No. 201910176087.0, filed on Mar. 8, 2019, which is hereby incorporated by reference in its entirety.

TECHNICAL FIELD

Embodiments of the disclosure relate to the field of energy storage technologies, in particular, to a control method for a DC/DC converter and the DC/DC converter.

BACKGROUND

With the rapid development of new energy and electric vehicle technologies, a bidirectional DC/DC converter has been more and more widely used in the fields of new energy, battery energy storage, etc. A control method of a bidirectional DC/DC converter is of great significance to promote new energy adaptation in various applications.

FIG. 1 is a schematic structural diagram of a resonant bidirectional DC/DC converter. As shown in FIG. 1, the resonant bidirectional DC/DC converter is a typical bidirectional DC/DC converter including primary side switches SW1, SW2, SW3 and SW4 and secondary side switches SW5, SW6, SW7, SW8 which are driven by driving signals S1, S2, S3, S4, S5, S6, S7 and S8 respectively. Conventionally, a control method of phase shift and variable frequency is applied to control the resonant bidirectional DC/DC converter. In a charging mode of the resonant bidirectional DC/DC converter, if the phase shift control method is applied, the driving signals S1 and S4 are in complementary with the driving signals S2 and S3. If necessary, the driving signals S6/S8, S5/S7, S5/S6, or S7/S8 may be set to have phase shift angles corresponding to the driving signals S1/S4 and S2/S3 respectively.

Taking the driving signals S6/S8 as an example, FIG. 2 illustrates a waveform diagram of driving signals and a primary side current in a resonant bidirectional DC/DC converter controlled by a conventional control method. FIG. 3 depicts a waveform diagram of current flowing through each secondary side switch (e.g. SW5~SW8) in the resonant bidirectional DC/DC converter controlled by the conventional control method. As shown in FIG. 2 and FIG. 3, if the output power of the resonant bidirectional DC/DC converter increases, the effective current through switches SW6/SW8 will become strong which results in a significant temperature difference between switches SW6/SW8 and switches SW5/SW7, and further causes heat imbalances among secondary side switches.

SUMMARY

Embodiments of the disclosure provide a control method for a DC/DC converter and the DC/DC converter, which solves the technical problem that, conventionally, when the DC/DC converter is controlled by a phase shift control method, the effective current through two switches of the DC/DC converter become strong thus causing a large temperature difference between the two switches of the DC/DC converter and the other switches of the DC/DC converter, and further causing heat imbalances among secondary side switches.

In a first aspect, an embodiment of the disclosure provides a control method for a DC/DC converter, where the DC/DC converter includes a primary side circuit and a secondary side circuit electrically isolated with each other, where the secondary circuit includes a first secondary side bridge arm consisting of a fifth switch and a sixth switch in series, and a second secondary side bridge arm consisting of a seventh switch and an eighth switch in series, and the first secondary side bridge arm is parallel to the second secondary side bridge arm, the method including:

providing a primary side driving signal to drive one or more primary side switches of the primary side circuit;

providing a sixth signal, a fifth signal, a seventh signal and an eighth signal, where a phase shift angle exists between the sixth signal and the primary side driving signal, and the sixth signal, the fifth signal, the seventh signal and the eighth signal in turn have a predetermined phase difference;

driving the sixth switch, the fifth switch, the seventh switch and the eighth switch according to the sixth signal, the fifth signal, the seventh signal and the eighth signal, respectively;

where the switching frequency of the sixth signal, the fifth signal, the seventh signal or the eighth signal is half of the switching frequency of the primary side driving signal.

In a second aspect, an embodiment of the disclosure provides a DC/DC converter, including:

a primary side circuit including a primary side switch which is driven by a primary side driving signal;

a secondary side circuit, electrically isolated with the primary side circuit, including a first secondary side bridge arm consisting of a fifth switch and a sixth switch in series, and a second secondary side bridge arm consisting of a seventh switch and an eighth switch in series, where the first secondary side bridge arm is parallel to the second secondary side bridge arm; and a control apparatus including:

a primary side control module, configured to provide the primary side driving signal to drive one or more primary side switches of the primary side circuit;

a signal providing module, configured to provide a sixth signal, a fifth signal, a seventh signal and an eighth signal, where a phase shift angle exists between the sixth signal and the primary side driving signal; the sixth signal, the fifth signal, the seventh signal and the eighth signal in turn have a predetermined phase difference; and the switching frequency of the sixth signal, the fifth signal, the seventh signal or the eighth signal is half of the switching frequency of the primary side driving signal; and a secondary side control module, configured to generate secondary side driving signals to drive the sixth switch, the fifth switch, the seventh switch and the eighth switch according to the sixth signal, the fifth signal, the seventh signal and the eighth signal.

Embodiments of the disclosure provide a control method for a DC/DC converter and the DC/DC converter. Since the sixth signal, the fifth signal, the seventh signal, and the eighth signal all have similar or same electronic characteristics except phase difference there between, the generated secondary side driving signals also have similar or same electronic characteristics but a phase difference existing there between. Thus, the effective value of the current flowing through each of the secondary side switches is almost the same. In consequence, the loss of the secondary side switches may be substantially identically, so that there may be no or less temperature difference among the secondary side switches, and the heat balance among the secondary side switches is achieved.

It should be understood that contents described in the above section of the summary are not intended to limit key or important features of the embodiment of the disclosure or to limit the scope. Other features of the disclosure will be easily understood by the following description.

BRIEF DESCRIPTION OF THE DRAWINGS

In order to more clearly illustrate the embodiments of the disclosure or the technical solutions in the prior art, a brief description of the accompanying drawings required to be used in embodiments or descriptions of the prior art will be given below. Obviously, the accompanying drawings described below are some embodiments of the disclosure, and other accompanying drawings may also be obtained by those of ordinary skilled in the art according to the accompanying drawings without any creative labor.

FIG. 5 is a flowchart of a control method for controlling a DC/DC converter according to Embodiment 2 of the disclosure;

FIG. 6 depicts a waveform diagram of driving signals S1~S8 for primary side and secondary side switches SW1~SW8, primary side voltage VAB, secondary side voltage VCD, primary side current IP, and current IS5~IS8 flowing through respective secondary side switches S5~S8 according to Embodiment 2 of the disclosure;

FIG. 7 is a flowchart of a control method for controlling a DC/DC converter according to Embodiment 3 of the disclosure;

FIG. 9 is a flowchart of a control method for controlling a DC/DC converter according to Embodiment 4 of the disclosure;

FIG. 10 is a flowchart of a control method for controlling a DC/DC converter according to Embodiment 5 of the disclosure;

FIG. 15 is a flowchart of a control method for a DC/DC converter according to Embodiment 6 of the disclosure;

DESCRIPTION OF EMBODIMENTS

The embodiments of the disclosure will be described in more detail below with reference to the accompanying drawings. Although some embodiments of the disclosure are shown in the accompanying drawings, it should be understood that the disclosure can be implemented in various forms and should not be illustrated as being limited to the embodiments set forth herein, and the embodiments are provided for a more thorough and complete understanding of the disclosure. It should be understood that the accompanying drawings and embodiments of the disclosure are for illustrative purposes only and are not intended to limit the protection scope.

Terms "first", "second", "third", "fourth" and the like (if any) in the description and claims in the disclosure and the above accompanying drawings are used for distinguishing similar objects and are not necessarily used for describing a particular order or sequence. It should be understood that the data used in this way may be interchanged where appropriate, so that the embodiments of the disclosure described herein may be implemented in an order other than those illustrated or described herein. Furthermore, terms "including" and "having" and any variations thereof are intended to cover non-exclusive inclusions. For example, a process, a method, a system, a product, or a device that includes a series of steps or elements is not necessarily limited to those steps or elements that are explicitly listed, but may include other steps or elements that are not explicitly listed or that are inherent to such the process, the method, the product, or the device.

Embodiments of the disclosure will be described below with reference to the accompanying drawings in the description.

Embodiment 1

Figure 4:
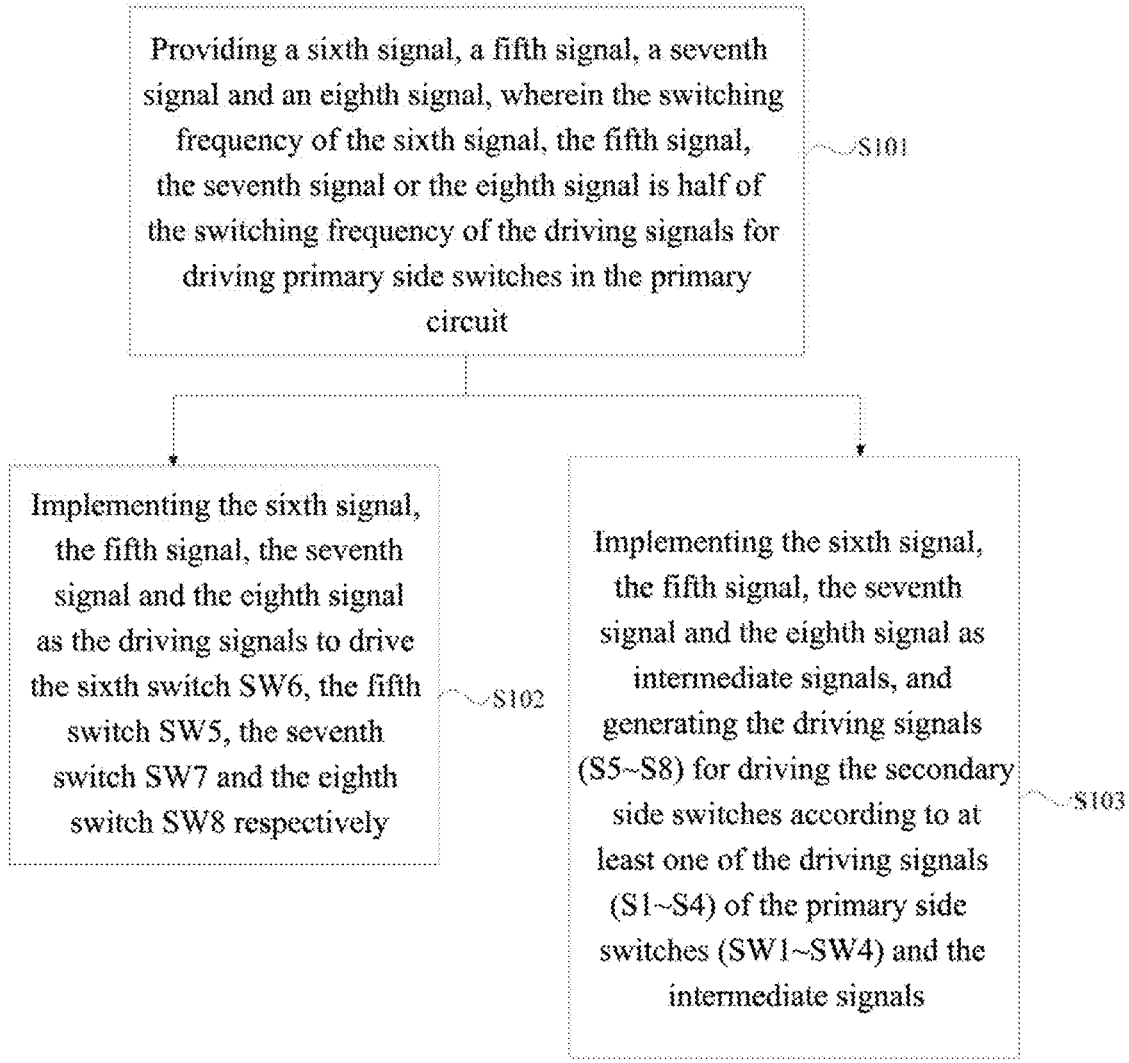
FIG. 4 is a flowchart of a control method for controlling a DC/DC converter according to Embodiment 1 of the disclosure.

FIG. 4 is a flowchart of a control method for controlling a DC/DC converter according to Embodiment 1 of the disclosure. A control method provided in the present embodiment for controlling the DC/DC converter is executed by a control apparatus of the DC/DC converter which has a primary circuit and a secondary circuit electrically isolated with each other. As shown in FIG. 4, the control method provided in the present embodiment includes following steps.

Step 101, providing a sixth signal, a fifth signal, a seventh signal and an eighth signal, wherein the switching frequency of the sixth signal, the fifth signal, the seventh signal or the eighth signal is half of the switching frequency of the driving signals for driving primary side switches in the primary circuit. The sixth signal, the fifth signal, the seventh signal and the eighth signal in turn have a predetermined phase difference between each other. And a phase shift angle exists between the sixth signal and a driving signal for the first switch SW1.

It should be known that the phase shift angle can be a phase angle between the sixth signal and other driving signal for driving the primary side switch other than the first switch SW1 in another embodiment of the disclosure.

In the present embodiment, the DC/DC converter includes: a first primary side bridge arm consisting of a first switch SW1 and a second switch SW2, a second primary side bridge arm consisting of a third switch SW3 and a fourth switch SW4, a first secondary side bridge arm consisting of a fifth switch SW5 and a sixth switch SW6, and a second secondary side bridge arm consisting of a seventh switch SW7 and an eighth switch SW8.

In the primary side, the first switch SW1 and the fourth switch SW4 can be controlled working as one pair. The second switch SW2 and the third switch SW3 can be controlled working as the other pair. In the secondary side of the DC/DC converter, the fifth switch SW5 and the eighth switch SW8 can be controlled working as one pair, and the sixth switch SW6 and the seventh switch SW7 can be controlled working as the other pair. A charge-discharge apparatus can be connected to one end of the DC/DC converter, and an energy storage apparatus could be connected to the other end of the DC/DC converter. The charge-discharge apparatus can charge power to the energy storage apparatus through the DC/DC converter, or the energy storage apparatus can discharge power through the DC/DC converter. The energy storage apparatus can be a battery, a super capacitor or the like.

Each switch in the primary side and the secondary side can realize a zero voltage switching. And the switch can be a MOSFET with a body diode.

In the present embodiment, the driving signals for driving the primary side switches are obtained, wherein the driving signals for driving the primary side switches may be pulse width modulation signals. The second switch SW2 and the third switch SW3 may be driven by one driving signal, and the first switch SW1 and the fourth switch SW4 may be driven by the other driving signal. The primary side switches' driving signals each have the same switching frequency.

In addition, in the present embodiment, the sixth signal, the fifth signal, the seventh signal and the eighth signal in turn have a predetermined phase difference between each other. If the predetermined phase difference is a positive value, the sixth signal, the fifth signal, the seventh signal and the eighth signal would be arranged in a manner of sequentially delayed in phase by the predetermined phase difference. If the predetermined phase difference is a negative value, the sixth signal, the fifth signal, the seventh signal and the eighth signal would be arranged in a manner of sequentially advanced in phase by the predetermined phase difference.

The predetermined phase difference may be 90°, 80° or other suitable values, which is not limited in the present embodiment.

In the present embodiment, a phase shift angle exists between the sixth signal and the driving signal of the first switch SW1. The value of the phase shift angle is not limited in the present embodiment.

Step 102, implementing the sixth signal, the fifth signal, the seventh signal and the eighth signal as the driving signals to drive the sixth switch SW6, the fifth switch SW5, the seventh switch SW7 and the eighth switch SW8 respectively.

Specifically, in the present embodiment, the sixth signal S6 acts as the driving signal for driving the sixth switch SW6, the fifth signal S5 acts as the driving signal for driving the fifth switch SW5, the seventh signal S7 acts as the driving signal for driving the seventh switch SW7, and the eighth signal S8 acts as the driving signal for driving the eighth switch SW8. In the context, through providing the driving signals to drive the secondary side switches (SW5~8) mentioned above, and providing driving signals to drive primary side switches respectively, the DC/DC converter is controlled to charge and discharge power accordingly. In consequence, the effective current flowing through each secondary side switch is substantially the same, so that the loss of each secondary side switch is substantially identical. Thus, there may be no or less temperature difference among secondary side switches, thereby achieving the heat balance among the secondary side switches.

Step 103, implementing the sixth signal, the fifth signal, the seventh signal and the eighth signal as intermediate signals, and generating the driving signals (S5~S8) for driving the secondary side switches according to at least one of the driving signals (S1~S4) of the primary side switches (SW1~SW4) and the intermediate signals.

It should be noted that step 102 and step 103 are alternative designs, the person of skilled in the art may control the DC/DC converter through either the step 102 or the step 103.

Specifically, the DC/DC converter can be operated in either an asynchronous rectification state or a synchronous rectification state. Through implementing the sixth signal, the fifth signal, the seventh signal and the eighth signal as intermediate signals, the generated secondary side driving signals (S5~S8) could control the secondary side switches (SW5~SW8) so as to operate the DC/DC converter in either the asynchronous rectification state or the synchronous rectification state. While implementing the sixth signal, the fifth signal, the seventh signal and the eighth signal as intermediate signals, the sixth signal is denoted as a first intermediate signal, the fifth signal is denoted as a second intermediate signal, the seventh signal is denoted as a third intermediate signal, and the eighth signal is denoted as a fourth intermediate signal.

In the control method of the DC/DC converter provided in the present embodiment, no matter the sixth signal, the fifth signal, the seventh signal and the eighth signal are provided to act as the secondary driving signals or the intermediate signals, the switching frequency of the sixth signal, the fifth signal, the seventh signal or the eighth signal is half of the switching frequency of the primary side driving signals (S1~S4). And, the sixth signal, the fifth signal, the seventh signal and the eighth signal in turn have a predetermined phase difference between each other. And a phase shift angle exists between the sixth signal and the driving signal S1 for driving the first switch SW1. Since the sixth signal, the fifth signal, the seventh signal, and the eighth signal all have similar or same electronic characteristics except phase difference there between, the generated secondary side driving signals (S5~S8) also have similar or same electronic characteristics but a phase difference existing there between. Thus, the effective value of the current flowing through each of the secondary side switches (SW5~SW8) is almost the same. In consequence, the loss of the secondary side switches may be substantially identically, so that there may be no or less temperature difference among the secondary side switches (SW5~SW8), and the heat balance among the secondary side switches (SW5~SW8) is achieved.

Embodiment 2

FIG. 5 is a flowchart of a control method for controlling a DC/DC converter according to Embodiment 2 of the disclosure. As shown in FIG. 5, the control method of the DC/DC converter provided in the present embodiment further elaborates the phase difference among the sixth signal, the fifth signal, the seventh signal and the eighth signal in the DC/DC converter provided in Embodiment 1 of the disclosure. In this embodiment, the sixth signal, the fifth signal, the seventh signal and the eighth signal are implemented to act as the driving signals (S5~S8). The control method for controlling the DC/DC converter provided in the present embodiment includes following steps.

Step 201, providing the sixth signal, the fifth signal, the seventh signal and the eighth signal, wherein the switching frequency of the sixth signal, the fifth signal, the seventh signal or the eighth signal is half of the switching frequency of the primary side driving signals (S1~S4), the sixth signal, the fifth signal, the seventh signal and the eighth signal in turn have a phase-lag, and a phase shift angle exists between the sixth signal and the driving signal of the first switch SW1.

Further, in the present embodiment, the DC/DC converter is a bidirectional converter, and the DC/DC converter further includes a resonant tank having a transformer.

Figure 1:
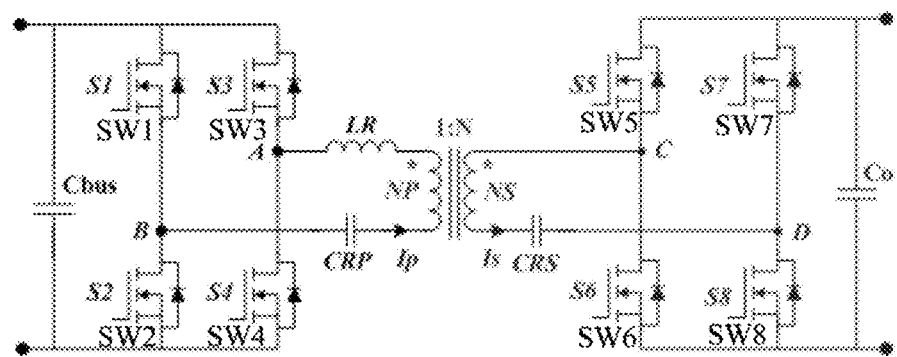
FIG. 1 depicts a schematic structural diagram of a resonant bidirectional DC/DC converter.
Figure 2:
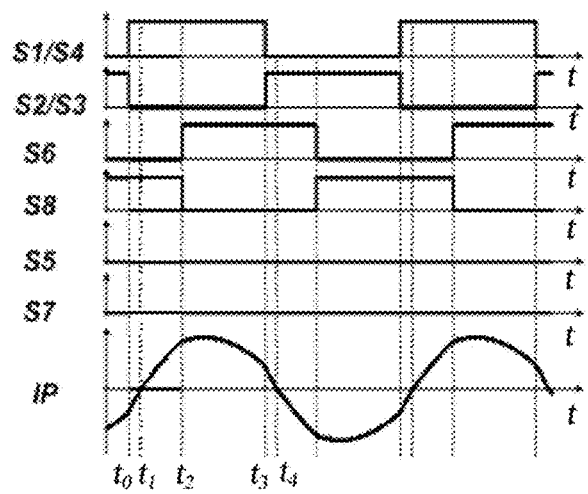
FIG. 2 depicts a waveform diagram of driving signals and primary side current of a resonant bidirectional DC/DC converter controlled by a conventional control method.
Figure 3:
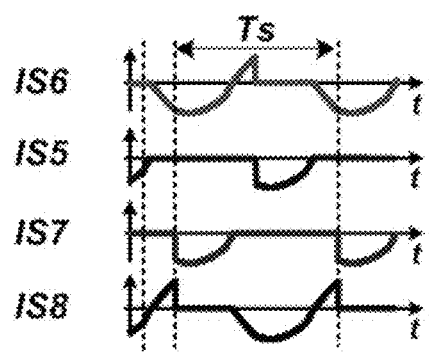
FIG. 3 depicts a waveform diagram of current flowing through each secondary side switch of a resonant bidirectional DC/DC converter controlled by a conventional control method.

Specifically, in the present embodiment, as shown in FIG. 1, the DC/DC converter is a resonant bidirectional DC/DC converter, wherein the resonant bidirectional DC/DC converter includes a resonant tank having a transformer, a primary side bridge having four primary side switches (SW1~SW4), namely the first switch SW1, the second switch SW2, the third switch (SW3) and the fourth switch (SW4) respectively, a secondary side bridge having four secondary side switches (SW5~SW8), namely the fifth switch SW5, the sixth switch SW6, the seventh switch SW7 and the eighth switch SW8.

Preferably, in the present embodiment, the sixth signal, the fifth signal, the seventh signal, and the eighth signal in turn have a phase-lag with a predetermined phase difference (denoted as θ). That means, the fifth signal lags the sixth signal in phase by θ, the seventh signal lags the fifth signal in phase by θ, the eighth signal also lags the seventh signal in phase by θ.

Preferably, in the present embodiment, the predetermined phase difference θ is 90 degrees.

Preferably, in the present embodiment, the duty cycle of each of the secondary side driving signals (S5~S8) is 25%, that is, the duty cycle of the sixth signal, the fifth signal, the seventh signal and the eighth signal is all 25%.

Step 202, implementing the sixth signal, the fifth signal, the seventh signal and the eighth signal to act as the secondary side driving signals (S6, S5, S7, S8) to drive the sixth switch SW6, the fifth switch SW5, the seventh switch SW7 and the eighth switch SW8 respectively.

Further, in the present embodiment, FIG. 6 depicts a waveform diagram of driving signals S1~S8 for primary side and secondary side switches SW1~SW8, primary side voltage VAB, secondary side voltage VCD, primary side current IP, and current IS5~IS8 flowing through respective secondary side switches SW5~SW8 according to Embodiment 2 of the disclosure. In the present embodiment, the second switch SW2 and the third switch SW3 are able to be driven by a first primary side driving signal, denoted as S2/S3 in FIG. 6. The first switch SW1 and the fourth switch SW4 are able to be driven by a second primary side driving signal, denoted as S1/S4 in FIG. 6. The first primary side driving signal S2/S3 is complementary to the second primary side driving signal S1/S4.

As shown in FIG. 6, in this embodiment, the driving signal S6 (e.g. the sixth signal) is used to drive the sixth switch SW6, the driving signal S5 (e.g. the fifth signal) is used to drive the fifth switch SW5, the driving signal S7 (e.g. the seventh signal) is used to drive the seventh switch SW7, and the driving signal S8 (e.g. the eighth signal) is used to drive the eighth switch SW8.

Therefore, in the present embodiment, corresponding primary side driving signals (S1~S4) are provided to control the respective primary side switches (SW1~SW4) and corresponding secondary side driving signals (S5~S8) are provided to control the respective secondary side switches (SW5~SW8). As shown in the FIG. 6, since the secondary side driving signals S6, S5, S7, S8 all have the similar electronic characteristics but a phase-lag by θ existing in turn, the effective values of current IS6, IS5, IS7, IS8 flowing through respective switches SW6, SW5, SW7, SW8 are substantially the same.

Therefore, the loss of secondary side switches may be the same, so that there is no or less temperature difference among the secondary side switches, and the heat balance among the secondary side switches is achieved.

Embodiment 3

FIG. 7 is a flowchart of a control method for controlling a DC/DC converter according to Embodiment 3 of the disclosure. As shown in FIG. 7, the control method of the DC/DC converter provided in the present embodiment further elaborates the phase difference among the sixth signal, the fifth signal, the seventh signal and the eighth signal in the DC/DC converter provided in Embodiment 1 of the disclosure. In this embodiment, the sixth signal, the fifth signal, the seventh signal and the eighth signal are implemented to act as driving signals (S5~S8). The control method for controlling the DC/DC converter provided in the present embodiment includes following steps.

Step 301, similar to the embodiment 2, providing the sixth signal, the fifth signal, the seventh signal and the eighth signal, wherein the switching frequency of the sixth signal, the fifth signal, the seventh signal or the eighth signal is half of the switching frequency of the primary side driving signals (S1~S4). Comparing with Embodiment 2, the sixth signal, the fifth signal, the seventh signal and the eighth signal in turn have a phase-lead, and a phase shift angle exists between the sixth signal and the driving signal of the first switch SW1.

Further, in the present embodiment, the DC/DC converter is a bidirectional converter, and the DC/DC converter further includes a resonant tank including a transformer.

Preferably, in the present embodiment, the sixth signal, the fifth signal, the seventh signal, and the eighth signal in turn have a phase-lead with a predetermined phase difference (denoted as θ). That means, the fifth signal leads the sixth signal in phase by θ, the seventh signal leads the fifth signal in phase by θ, the eighth signal also leads the seventh signal in phase by θ.

Preferably, in the present embodiment, the predetermined phase difference θ is 90 degrees.

Preferably, in the present embodiment, the duty cycle of each of the secondary side driving signals (S5~S8) is 25%, that is, the duty cycle of the sixth signal, the fifth signal, the seventh signal and the eighth signal is all 25%.

Step 302, implementing the sixth signal, the fifth signal, the seventh signal and the eighth signal to act as the secondary side driving signals (S6, S5, S7, S8) to drive the sixth switch SW6, the fifth switch SW5, the seventh switch SW7 and the eighth switch SW8 respectively.

Figure 8:
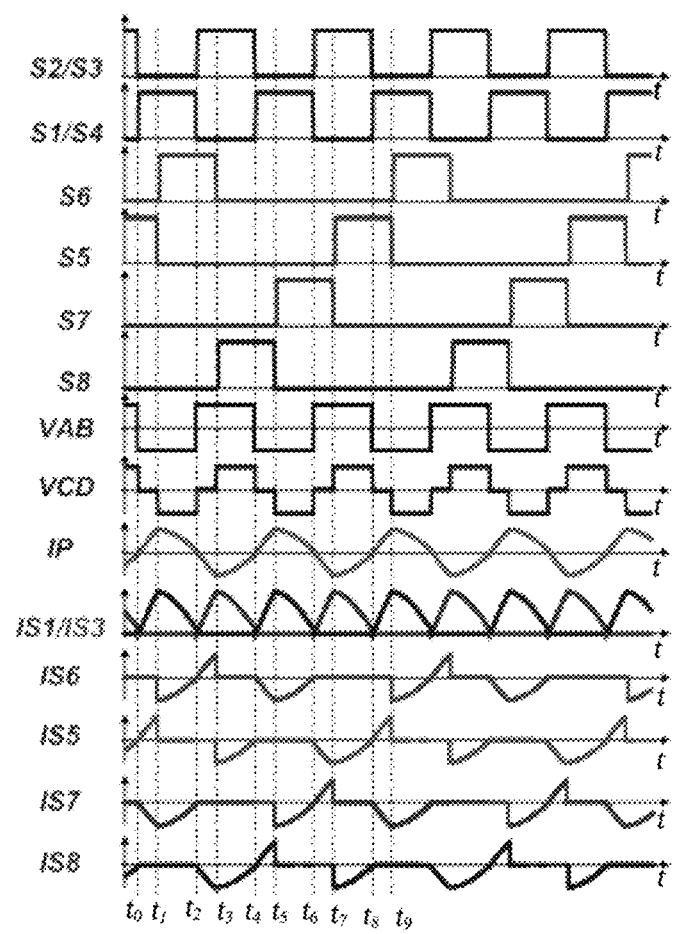
FIG. 8 depicts a waveform diagram of driving signals S1~S8 of primary side and secondary side switches SW1~SW8, primary side voltage VAB, secondary side voltage VCD, primary side current IP, and current IS5~IS8 flowing through respective secondary side switches SW5~SW8 according to Embodiment 3 of the disclosure.

Further, in the present embodiment, FIG. 8 depicts a waveform diagram of driving signals S1~S8 of primary side and secondary side switches SW1~SW8, primary side voltage VAB, secondary side voltage VCD, primary side current IP, and current IS5-IS8 flowing through respective secondary side switches SW5~SW8 according to Embodiment 3 of the disclosure. In the present embodiment, the second switch SW2 and the third switch SW3 are able to be driven by the first primary side driving signal, denoted as S2/S3 in FIG. 8. The first switch SW1 and the fourth switch SW4 are able to be driven by the second primary side driving signal, denoted as S1/S4 in FIG. 8. The first primary side driving signal S2/S3 is complementary to the second primary side driving signal S1/S4.

As shown in FIG. 8, in this embodiment, the driving signal S6 (e.g. the sixth signal) is used to drive the sixth switch SW6, the driving signal S5 (e.g. the fifth signal) is used to drive the fifth switch SW5, the driving signal S7 (e.g. the seventh signal) is used to drive the seventh switch SW7, and the driving signal S8 (e.g. the eighth signal) is used to drive the eighth switch SW8.

Therefore, in the present embodiment, corresponding primary side driving signals (S1~S4) are provided to the control respective primary side switches (SW~SW4) and corresponding secondary side driving signals (S5~S8) are provided to control the respective secondary side switches (SW5~SW8). As shown in the FIG. 8, since the secondary side driving signals S6, S5, S7, S8 all have the similar electronic characteristics but a phase-lead by θ existing in turn, the effective values of current IS6, IS5, IS7, IS8 flowing through respect switches SW6, SW5, SW7, SW8 are substantially the same.

Therefore, the loss of the secondary side switches may be the same, so that there is no or less temperature difference between the secondary side switches, and the heat balance among the secondary side switches is achieved.

Embodiment 4

FIG. 9 is a flowchart of a control method for controlling a DC/DC converter according to Embodiment 4 of the disclosure. The control method of the DC/DC converter provided in the present embodiment illustrates a method of generating the secondary side driving signals S5~S8 through intermediate signals and at least one of the primary side driving signals as disclosed in step 103. The control method for the DC/DC converter provided in the present embodiment includes following steps.

Step 401, providing the sixth signal, the fifth signal, the seventh signal and the eighth signal. In the present embodiment, the implementation of step 401 can be the same as the step 201 in Embodiment 2 or the same as the step 301 in Embodiment 3 of the disclosure, which will not be repeated herein.

Step 402, implementing the sixth signal, the fifth signal, the seventh signal and the eighth signal to act as intermediate signals, and generating the secondary side driving signals (S5~S8) for operating the DC/DC converter in an asynchronous rectification state or in a synchronous rectification state through a digital computing method, and applying the generated secondary side driving signals (S5~S8) to drive the corresponding secondary side switches (SW5~SW8), respectively.

Further, in the present embodiment, the secondary side switches (SW5~SW8) may be operated in an asynchronous rectification state or in a synchronous rectification state. If the secondary side switches (SW5~SW8) are controlled to operate in the synchronous rectification state, the driving signal S5 is complementary to the driving signal S6, and the driving signal S7 is complementary to the driving signal S8.

It can be understood that the digital computing method implemented for operating the secondary side switches in an asynchronous rectification state is different from the digital computing method applied for operating the secondary side switches in a synchronous rectification state. Thus the generated driving signals (S5~S8) for operating in an asynchronous rectification state are different from those for operating in a synchronous rectification state.

In practical application, if the secondary side switches are controlled in an asynchronous rectification state, the DC/DC converter is charged and discharged in an asynchronous rectification state. If the secondary side switches are controlled in a synchronous rectification state, the DC/DC converter is charged and discharged in a synchronous rectification state.

In the control method of the DC/DC converter provided in the present embodiment, the secondary side driving signals S5~S8 are generated through digital computing to the intermediate signals and at least one of the primary side driving signals so as to drive the secondary side switches in either the asynchronous rectification state or a synchronous rectification state. And the effective value of the current flowing through each of the secondary side switches is almost the same. Therefore, the loss of the secondary side switches may be the same, so that there is no or less temperature difference among the secondary side switches, and the heat balance among the secondary side switches is achieved.

Embodiment 5

FIG. 10 is a flowchart of a control method for controlling a DC/DC converter according to Embodiment 5 of the disclosure. The control method of the DC/DC converter provided in the present embodiment illustrates a method of generating the secondary side driving signals S5~S8 according to intermediate signals and at least one of the primary side driving signals as described in step 103 so as to operate the DC/DC converter in an asynchronous rectification state. The control method of the DC/DC converter provided in the present embodiment includes following steps.

Step 501, providing the sixth signal, the fifth signal, the seventh signal and the eighth signal. In the present embodiment, the implementation of step 501 can be implemented the same as described in the step 201 of Embodiment 2 or the same as described in the step 301 of Embodiment 3 of the disclosure, which will not be repeated here for the sake of brevity.

Step 502, implementing the sixth signal to act as a first intermediate signal, the fifth signal to act as a second intermediate signal, the seventh signal to act as a third intermediate signal and the eighth signal to act as a fourth intermediate signal; performing logic gate operations to the intermediate signals and at least one primary side driving signal so as to generate secondary side driving signals to control the DC/DC converter to be operated in an asynchronous rectification state.

The logic gate operations includes: performing an AND operation to the first primary side driving signal S2/S3 and the first intermediate signal S6A so as to generate the driving signal S6, and performing an AND operation to the first primary side driving signal S2/S3 and the third intermediate signal S7A so as to generate the driving signal S7; performing an AND operation to the second primary side driving signal S1/S4 and the second intermediate signal SSA so as to generate the driving signal S5, and performing an AND operation to the second primary side driving signal S1/S4 and the fourth intermediate signal S8A so as to generate the driving signal S8; and using the generated driving signals (S5~S8) to drive the corresponding secondary side switches (SW5~SW8), respectively.

In the present embodiment, the DC/DC converter is operated in an asynchronous rectification state. The primary side driving signals are applied to perform an AND operation with respective intermediate signals to generate the secondary side driving signals for driving the corresponding secondary side switches. Since the switching frequency of the intermediate signals is half of the switching frequency of the primary side driving signals, the switching frequency of the generated secondary side driving signals is also half of the switching frequency of the primary side driving signals. Specifically, in this embodiment, the DC/DC converter is operated in the asynchronous rectification state, the intermediate signals in turn have a predetermined phase difference between each other. In one case, if the predetermined phase difference is a phase-lag, the generated driving signals (S6, S5, S7, S8) in turn are also have a phase-lag between each other. In other case, if the predetermined phase difference is a phase-lead, the generated driving signals (S6, S5, S7, S8) in turn are also have a phase-lead between each other.

Figure 11:
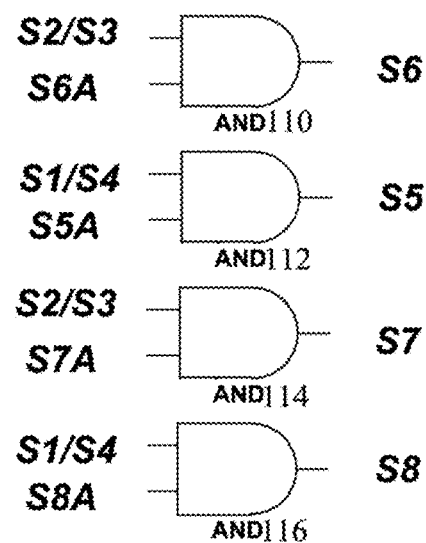
FIG. 11 is a first schematic diagram showing a logic gate operation in the method according to Embodiment 5 of the disclosure.

Further, FIG. 11 is a first schematic diagram showing a logic gate operation (e.g. AND operation) according to this embodiment. As shown in FIG. 11, if the sixth signal, the fifth signal, the seventh signal and the eighth signal in turn exist a phase-lag by the predetermined phase difference, that is, the first intermediate signal (denoted as S6A), the second intermediate signal (denoted as S5A), the third intermediate signal (denoted as S7A) and the fourth intermediate signal (denoted as S8A) in turn are also existing phase-lag by the predetermined phase difference. In FIG. 11, the AND operations are performed by AND gates 110, 112, 114, 116. The AND gate 110 receives the first primary side driving signal S2/S3 and the first intermediate signal S6A in its input ports and generates the driving signal S6 in its output port for controlling the sixth switch SW6. Respectively, the AND gate 112 receives the first primary side driving signal S2/S3 and the third intermediate signal S7A in its input ports and generates the driving signal S7 in its output port for controlling the seventh switch SW7. The AND gate 114 receives the second primary side driving signal S1/S4 and the second intermediate signal S5A in its input ports and generates the driving signal S5 in its output port for controlling the fifth switch SW5. And the AND gate 116 receives the second primary side driving signal S1/S4 and the fourth intermediate signal S8A and generates the driving signal S8 in its output port for controlling the eighth switch SW8.

Figure 12:
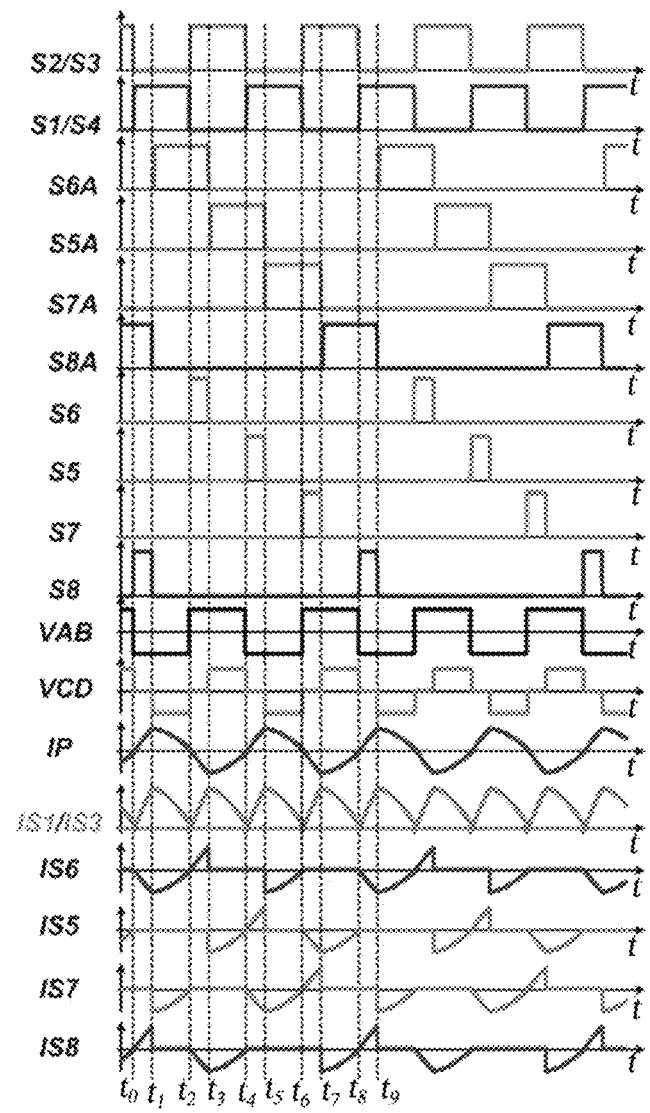
FIG. 12 depicts a first waveform diagram of intermediate signals S5A~S8A, driving signals S1~S8, primary side voltage VAB, secondary side voltage VCD, primary side current IP and current IS5~IS8 flowing through respective secondary side switches SW5~SW8 according to Embodiment 5 of the disclosure.

Correspondingly, FIG. 12 depicts a first waveform diagram of intermediate signal S5A~S8A, driving signals S1~S8, primary side voltage VAB, secondary side voltage VCD, primary side current IP and current IS5~IS8 flowing through respective secondary side switches SW5~SW8 in the method according to Embodiment 5 of the disclosure. As shown in FIG. 12, the intermediate signals S6A, S5A, S7A, S8A have the similar electronic characteristics but a phase-lag existing there between in turn. The generated secondary side driving signals S6, S5, S7, S8 also have the similar electronic characteristics but a phase-lag existing in turn and are implemented to control/drive the secondary side switches SW6, SW5, SW7, SW8 respectively in an asynchronous rectification state. Therefore, the current IS6, IS5, IS7, IS8 flowing through the secondary side switches SW6, SW5, SW7, SW8 are substantially the same. In other word, the effective current values among the secondary side switches SW6, SW5, SW7, SW8 are almost identical.

Figure 13:
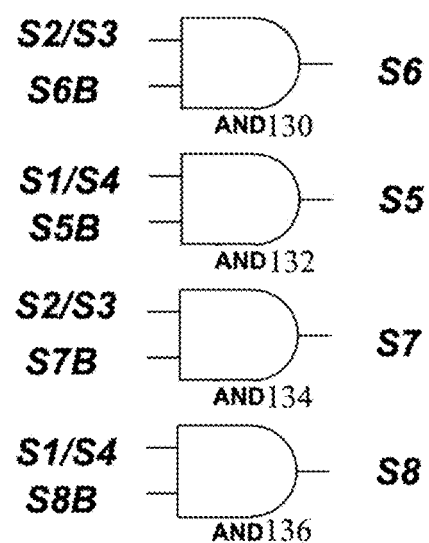
FIG. 13 is a second schematic diagram of showing a logic gate operation according to Embodiment 5 of the disclosure.

Further, FIG. 13 is a second schematic diagram showing a logic gate operation (e.g. AND operation) according to Embodiment 5 of the disclosure. As shown in FIG. 13, if the sixth signal, the fifth signal, the seventh signal and the eighth signal in turn exist a phase-lead by the predetermined phase difference, that is, the first intermediate signal (denoted as S6B), the second intermediate signal (denoted as S5B), the third intermediate signal (denoted as S7B) and the fourth intermediate signal (denoted as S8B) are also existing a phase-lead by the predetermined phase difference. In FIG. 13, the AND operations are performed by AND gates 130, 132, 134, 136. The AND gate 130 receives the first primary side driving signal S2/S3 and the first intermediate signal S6B in its input ports and generates the driving signal S6 in its output port for controlling the sixth switch SW6. Respectively, the AND gate 132 receives the first primary side driving signal S2/S3 and the third intermediate signal S7B in its input ports and generates the driving signal S7 in its output port for controlling the seventh switch SW7. The AND gate 134 receives the second primary side driving signal S1/S4 and the second intermediate signal S5B in its input ports and generates the driving signal S5 in its output port for controlling the fifth switch SW5. And the AND gate 136 receives the second primary side driving signal S1/S4 and the fourth intermediate signal S8B and generates the driving signal S8 in its output port for controlling the eighth switch SW8.

Figure 14:
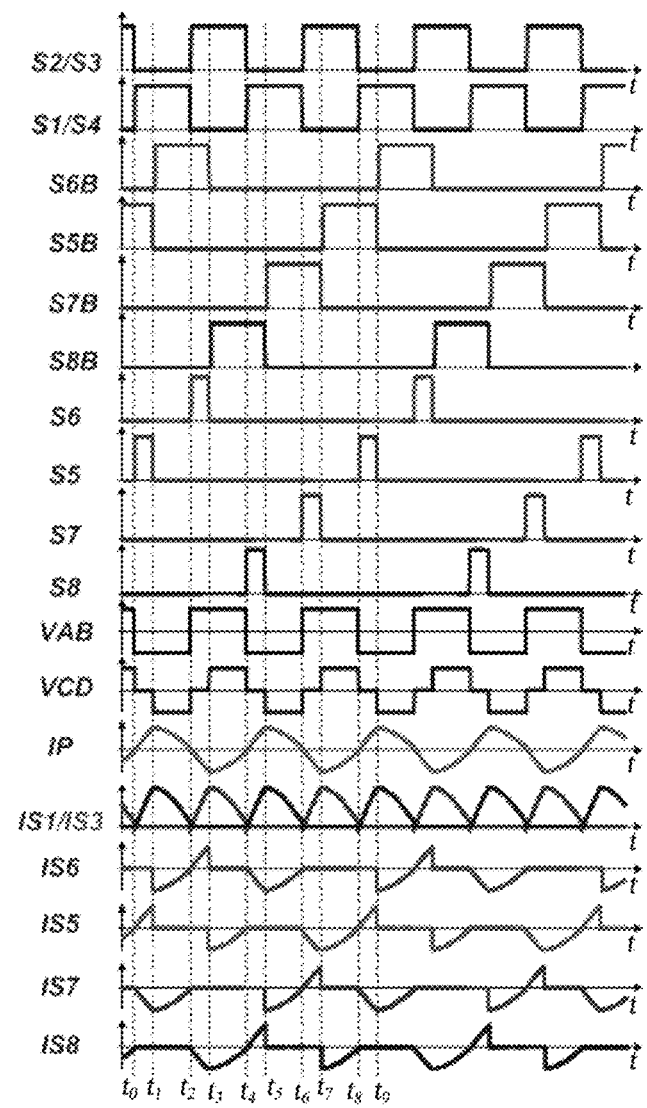
FIG. 14 is a second waveform diagram of intermediate signals S5B~S8B, driving signals S1~S8, primary side voltage VAB, secondary side voltage VCD, primary side current IP and current IS5~IS8 flowing through respective secondary side switches SW5~SW8 according to Embodiment 5 of the disclosure.

Correspondingly, FIG. 14 illustrates a second waveform diagram of intermediate signals S5B~S8B, driving signals S1~S8, primary side voltage VAB, secondary side voltage VCD, primary side current IP and current IS5~IS8 flowing through respective secondary side switches SW5~SW8 in the method according to Embodiment 5 of the disclosure. As shown in FIG. 14, the intermediate signals S6B, S5B, S7B, S8B have the similar electronic characteristics but a phase-lead existing in turn. The generated secondary side driving signals S6, S5, S7, S8 also have the similar electronic characteristics but a phase-lead existing in turn and are implemented to control/drive the secondary side switches SW6, SW5, SW7, SW8 respectively in an asynchronous rectification state. Therefore, the current IS6, IS5, IS7, IS8 flowing through the secondary side switches SW6, SW5, SW7, SW8 are substantially the same. In other word, the effective current values among the secondary side switches SW6, SW5, SW7, SW8 are almost identical.

In the control method for the DC/DC converter provided in the present embodiment, the logic gate operations may be used for generating the secondary side driving signals to balance the conducting loss among the secondary side switches operated in an asynchronous rectification state, so that there is no or less temperature difference among the secondary side switches, and the heat balance among the secondary side switches is achieved.

Embodiment 6

FIG. 15 is a flowchart of a control method for a DC/DC converter according to Embodiment 6 of the disclosure. The control method of the DC/DC converter provided in the present embodiment illustrates a method of generating the secondary side driving signals S5~S8 according to intermediate signals and at least one of the primary side driving signals as described in step 103 so as to operate the DC/DC converter in a synchronous rectification state. The control method of the DC/DC converter provided in the present embodiment includes following steps.

Step 601, providing the sixth signal, the fifth signal, the seventh signal and the eighth signal. In the present embodiment, the implementation of step 601 can be implemented the same as described in the step 201 of Embodiment 2 or the same as described in the step 301 of Embodiment 3 of the disclosure, which will not be repeated here for the sake of brevity.

Step 602, implementing the sixth signal to act as a first intermediate signal, the fifth signal to act as a second intermediate signal, the seventh signal to act as a third intermediate signal and the eighth signal to act as a fourth intermediate signal; performing logic gate operations to intermediate signals and at least one primary side driving signal so as to generate secondary side driving signals to control the DC/DC converter to be operated in a synchronous rectification state.

The logic gate operations includes: performing a NAND operation to the second primary side driving signal S1/S4 and the second intermediate signal S5A to generate a first NAND gate output signal; performing an OR operation to the second primary side driving signal S1/S4 and the first intermediate signal S6A to generate a first OR gate output signal; performing an AND operation to the first NAND gate output signal and the first OR gate output signal so as to generate the driving signal S6 for controlling the sixth switch SW6; performing a NOT operation to the driving signal S6 so as to generate the driving signal S5 for controlling the fifth switch SW5; performing a NAND operation to the second primary side driving signal S1/S4 and the fourth intermediate signal S8A to generate a second NAND gate output signal; performing an OR operation to the second primary side driving signal S1/S4 and the third intermediate signal S7A to generate a second OR gate output signal; performing an AND gate operation on the second NAND gate driving signal and the second OR gate driving signal to generate the driving signal S7 for controlling the seventh switch SW7, performing a NOT gate operation on the driving signal S7 to generate the driving signal S8 for controlling the eighth switch SW8.

In the present embodiment, the DC/DC converter is operated in a synchronous rectification state. After a plurality of logic gate operations are applied to the second primary side driving signals and the intermediate signals, the generated driving signals are implemented to drive the secondary side switches. Since the switching frequency of intermediate signals is half of the switching frequency of the primary side driving signals, the switching frequency of the generated secondary side driving signals is also half of the switching frequency of the primary side driving signals. And the secondary side driving signals operate the DC/DC converter in the synchronous rectification state, the driving signal S5 for driving the fifth switch SW5 is complementary to the driving signal S6 for driving the sixth switch SW6, and the driving signal S7 for driving the seventh switch SW7 is complementary to the driving signal S8 for driving the eighth switch SW8.

Figure 16:
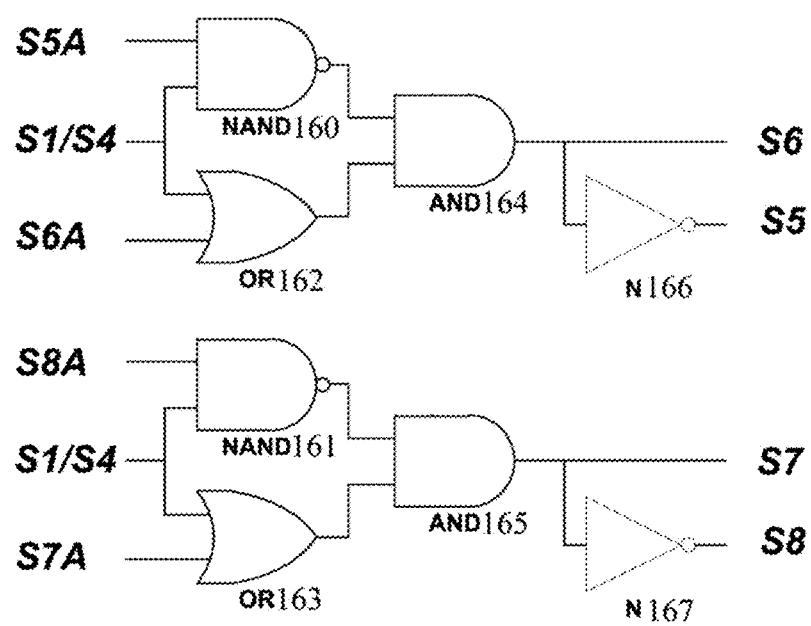
FIG. 16 is a first schematic diagram of showing a logic gate operation according to Embodiment 6 of the disclosure.

Further, FIG. 16 is a first schematic diagram showing a logic gate operation according to this embodiment. As shown in FIG. 16, if the sixth signal, the fifth signal, the seventh signal and the eighth signal in turn exist a phase-lag by the predetermined phase difference, that is, the first intermediate signal (denoted as S6A), the second intermediate signal (denoted as S5A), the third intermediate signal (denoted as S7A) and the fourth intermediate signal (denoted as S8A) in turn are also existing a phase-lag by the predetermined phase difference. In FIG. 16, the logic gate operations are performed by logic gates e.g. NAND gate, OR gate, AND gate, NOT gate or the like, the person of skill in the art can implement it in any combination without limitation. An NAND gate 160 receives the second primary side driving signal S1/S4 and the second intermediate signal S5A in its input ports and generates the first NAND gate output signal. An OR gate 162 receives the second primary side driving signal S1/S4 and the first intermediate signal S6A in its input ports to generate the first OR gate output signal. An AND gate 164 receives the first NAND gate output signal and the first OR gate output signal in its input ports and generates the driving signal S6 in its output port for controlling the sixth switch SW6. And a NOT gate 166 receives the driving signal S6 and generates the driving signal S5 for controlling the fifth switch SW5. An NAND gate 161 receives the second primary side driving signal S1/S4 and the fourth intermediate signal S8A in its input ports and generates the second NAND gate output signal. An OR gate 163 receives the second primary side driving signal S1/S4 and the third intermediate signal S7A and generates the second OR gate output signal. An AND gate 165 receives the second NAND gate output signal and the second OR gate output signal in its input ports and generates the driving signal S7 for controlling the seventh switch SW7. And a NOT gate 167 receives the driving signal S7 and generates the driving signal S8 for controlling the eighth switch SW8.

Figure 17:
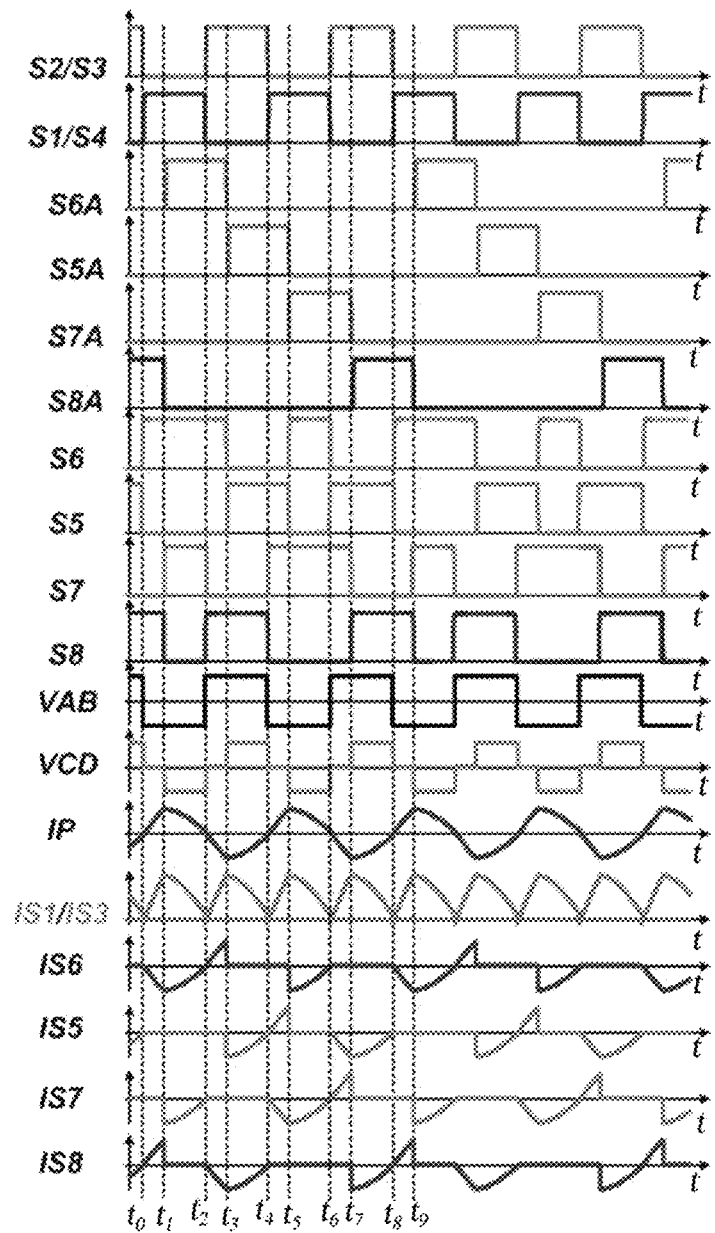
FIG. 17 illustrates a first waveform diagram of intermediate signals S5A~S8A, driving signals S1~S8, primary side voltage VAB, secondary side voltage VCD, primary side current IP and current IS5~IS8 flowing through respective secondary side switches SW5~SW8 according to Embodiment 6 of the disclosure.

FIG. 17 illustrates a first waveform diagram of intermediate signal S5A~S8A, driving signals S1~S8, primary side voltage VAB, secondary side voltage VCD, primary side current IP and current IS5~IS8 flowing through respective secondary side switches SW5~SW8 according to Embodiment 6 of the disclosure. As shown in FIG. 17, the intermediate signals S6A, SSA, S7A, S8A have the similar electronic characteristics but a phase-lag existing there between in turn. The generated driving signal S5 for controlling the secondary side switch SW5 in a synchronous rectification state is complementary to the driving signal S6 for controlling the sixth switch SW6 in a synchronous rectification state. The driving signal S7 for controlling the seventh switch SW7 in a synchronous rectification state is complementary to the driving signal S8 for controlling the eighth switch SW8 in a synchronous rectification state. The secondary side switches are driven by the driving signals in a synchronous rectification state respectively, so that the effective value of the current IS5~IS8 flowing through each of the secondary side switches SW5~SW8 is substantially the same when the DC/DC converter is operated in charging mode or in discharging mode. Therefore, the loss among the secondary side switches is substantially the same.

Figure 18:
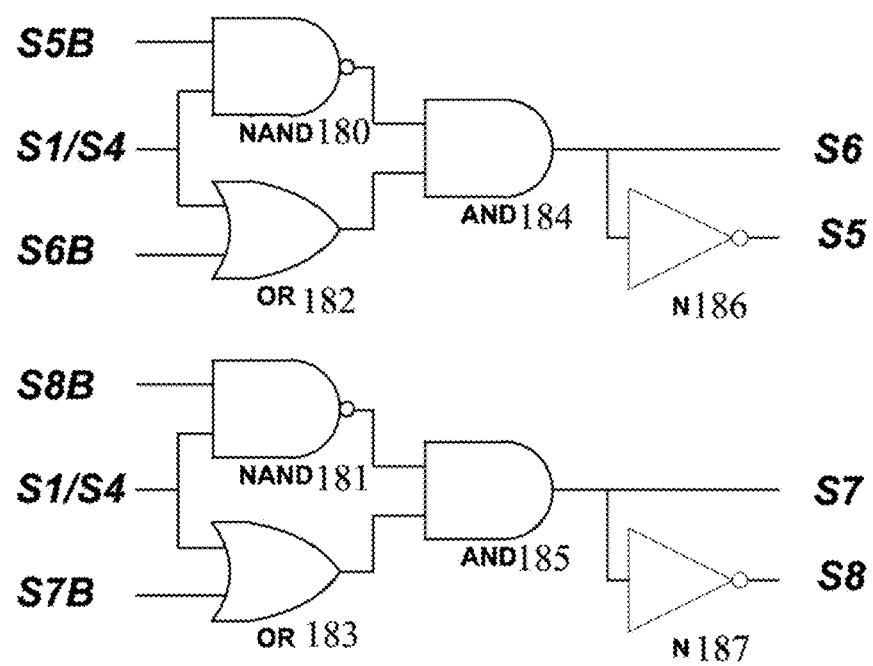
FIG. 18 is a second schematic diagram showing a logic gate operation in the method according to Embodiment 6 of the disclosure.

Further, FIG. 18 is a second schematic diagram showing a logic gate operation according to Embodiment 6 of the disclosure. As shown in FIG. 18, if the sixth signal, the fifth signal, the seventh signal and the eighth signal in turn exist a phase-lead by the predetermined phase difference there between, that is, the first intermediate signal (denoted as S6B), the second intermediate signal (denoted as S5B), the third intermediate signal (denoted as S7B) and the fourth intermediate signal (denoted as S8B) are also existing a phase-lead by the predetermined phase difference there between. In FIG. 18, the logic gate operations are performed by logic gates e.g. NAND gate, OR gate, AND gate, NOT gate or the like, the person of skill in the art can implement it in any combination without limitation. An NAND gate 180 receives the second primary side driving signal S1/S4 and the second intermediate signal S5B in its input ports and generates the first NAND gate output signal. An OR gate 182 receives the second primary side driving signal S1/S4 and the first intermediate signal S6B in its input ports and generates the first OR gate output signal. An AND gate 184 receives the first NAND gate output signal and the first OR gate output signal and generates the driving signal S6 in its output port for controlling the sixth switch SW6. And a NOT gate 186 receives the driving signal S6 and generates the driving signal S5 for controlling the fifth switch SW5. An NAND gate 181 receives the second primary side driving signal S1/S4 and the fourth intermediate signal S8B in its input ports and generates the second NAND gate output signal. An OR gate 183 receives the second primary side driving signal S1/S4 and the third intermediate signal S7B in its input ports and generates the second OR gate output signal. An AND gate 185 receives the second NAND gate output signal and the second OR gate output signal and generates the driving signal S7 in its output port for controlling the seventh switch SW7. A NOT gate 187 receives the driving signal S7 and generates the driving signal S8 for controlling the eighth switch SW8.

Figure 19:
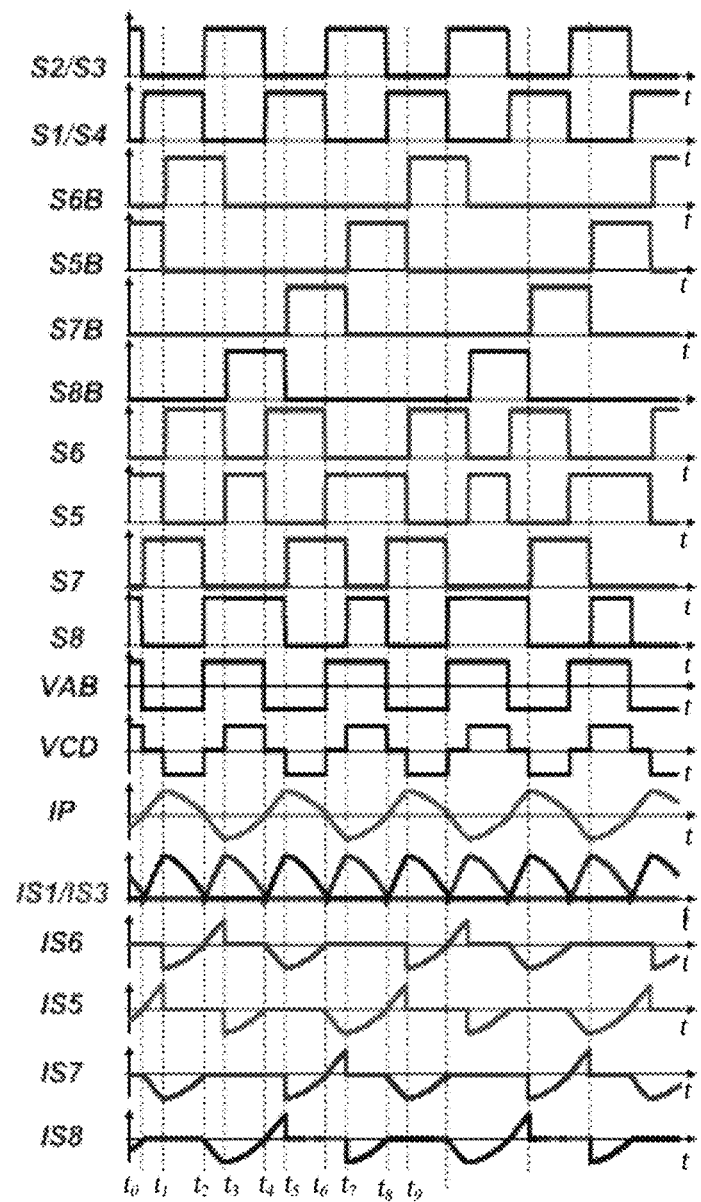
FIG. 19 illustrates a second waveform diagram of intermediate signals S5B~S8B, driving signals S1~S8, primary side voltage VAB, secondary side voltage VCD, primary side current IP and current IS5~IS8 flowing through respective secondary side switches SW5~SW8 according to Embodiment 6 of the disclosure.

Correspondingly, FIG. 19 illustrates a second waveform diagram of intermediate signals S5B~S8B, driving signals S1~S8, primary side voltage VAB, secondary side voltage VCD, primary side current IP and current IS5~IS8 flowing through respective secondary side switches SW5~SW8 according to Embodiment 6 of the disclosure. As shown in FIG. 19, the intermediate signals S6B, S5B, S7B, S8B have the similar electronic characteristics but a phase-lead existing there between in turn. The generated driving signal S5 for controlling the fifth switch SW5 is complementary to the driving signal S6 for controlling the sixth switch SW6. The driving signal S7 for controlling the seventh switch SW7 is complementary to the driving signal S8 for controlling the eighth switch SW8. The secondary side switches are driven by the driving signals in a synchronous rectification state, so that the effective value of the current IS5~IS8 flowing through each of the secondary side switches SW5~SW8 is substantially the same when the DC/DC converter is operated in charging mode and in discharging mode. Therefore, the loss among the secondary side switches is substantially the same.

In the control method of the DC/DC converter provided in the present embodiment, the logic gate operations may be used for generating the secondary side driving signals to balance the conducting loss among the secondary side switches operated in a synchronous rectification state, so that there is no or less temperature difference among the secondary side switches, and the heat balance among the secondary side switches is achieved.

Embodiment 7

Figure 20:
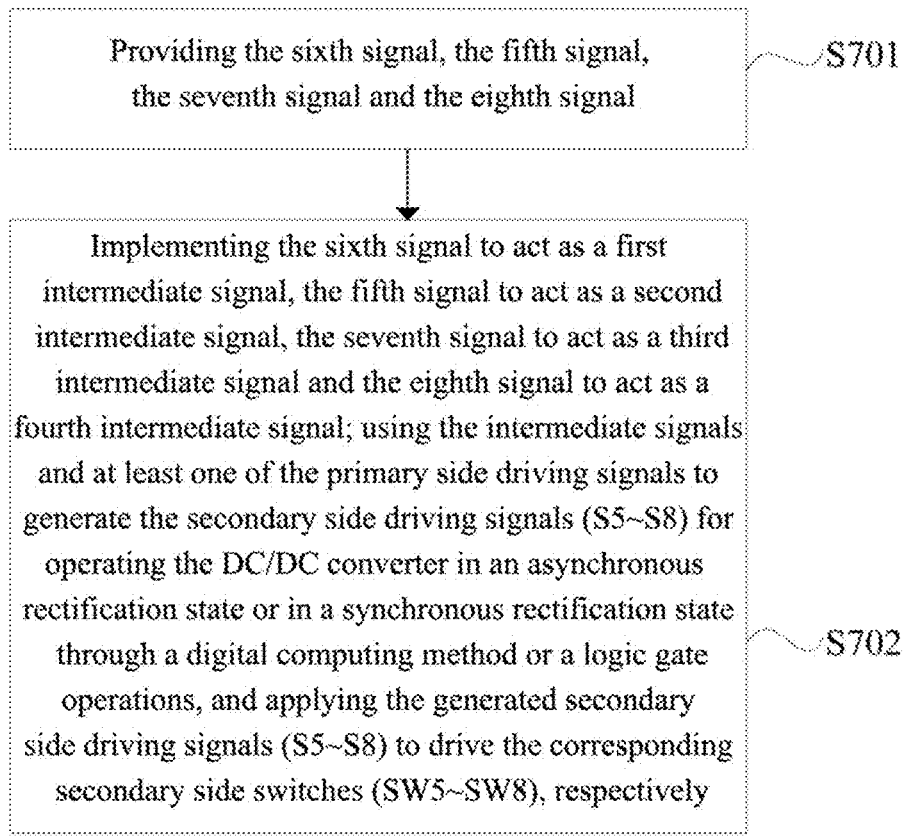
FIG. 20 is a flowchart of a control method for a DC/DC converter according to Embodiment 7 of the disclosure.

FIG. 20 is a flowchart of a control method for a DC/DC converter according to Embodiment 7 of the disclosure. As shown in FIG. 20, the control method of the DC/DC converter provided in the present embodiment illustrates a method of generating the secondary side driving signals S5~S8 through intermediate signals and at least one of the primary side driving signals as disclosed in step 103. The control method for the DC/DC converter provided in the present embodiment includes following steps.

Step 701, providing the sixth signal, the fifth signal, the seventh signal and the eighth signal. In the present embodiment, the implementation of the step 701 can be the same as the step 201 in Embodiment 2 or the same as that of the step 301 in Embodiment 3, which will not be repeated herein.

Step 702, implementing the sixth signal to act as a first intermediate signal, the fifth signal to act as a second intermediate signal, the seventh signal to act as a third intermediate signal and the eighth signal to act as a fourth intermediate signal; using the intermediate signals and at least one of the primary side driving signals to generate the secondary side driving signals (S5~S8) for operating the DC/DC converter in an asynchronous rectification state or in a synchronous rectification state through a digital computing method or a logic gate operations, and applying the generated secondary side driving signals (S5~S8) to drive the corresponding secondary side switches (SW5~SW8), respectively.

Embodiment 5 and the respective drawings FIGS. 10~14 depict an example that the generated secondary side driving signals having a shortest "ON" period which operates the DC/DC converter in an asynchronous rectification state. Embodiment 6 and the respective drawings FIGS. 15~19 depict an example that the generated secondary side driving signals having a longest "ON" period which operates the DC/DC converter in a synchronous rectification state.

It can be understood that a skilled person in the art would appreciate to implement a preferred digital computing method and/or logic gate operations to at least one of the primary side driving signals and the intermediate signals so as to generate the secondary side driving signals having an "ON" period within the shortest and the longest "ON" period demonstrated in previous embodiments. As a result, the effective value of the current flowing through each of the secondary side switches is almost the same. Therefore, the conductive loss of the secondary side switches may be the same, so that there is no or less temperature difference among the secondary side switches, and the heat balance among them can be achieved.

Embodiment 8

Figure 21:
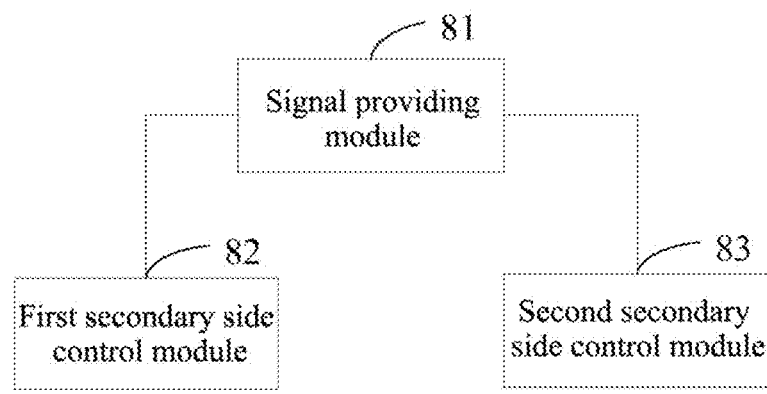
FIG. 21 is a block diagram of a control apparatus for controlling a DC/DC converter according to Embodiment 8 of the disclosure.

FIG. 21 is a block diagram of a control apparatus for controlling a DC/DC converter according to Embodiment 8 of the disclosure. As shown in FIG. 21, the control apparatus includes a signal providing module 81, and either a first secondary side control module 82 or a second secondary side control module 83. Similar to step 102 and step 103 in FIG. 4, the first secondary side control module 82 and the second secondary side control module 83 are alternative designs, the person of skill in the art may implement it to control the DC/DC converter through in its preference.

The DC/DC converter includes: the first primary side bridge arm including the first switch SW1 and the second switch SW2, the second primary side bridge arm including the third switch SW3 and the fourth switch SW4, the first secondary side bridge arm including the fifth switch SW5 and the sixth switch SW6, and the second secondary side bridge arm including the seventh switch SW7 and the eighth switch SW8.

In the present embodiment, the signal providing module 81 is implemented for providing the sixth signal, the fifth signal, the seventh signal and the eighth signal. The switching frequency of the sixth signal, the fifth signal, the seventh signal and the eighth signal is half of the switching frequency of the primary side driving signals. The sixth signal, the fifth signal, the seventh signal and the eighth signal in turn exist a predetermined phase difference. And a phase shift angle exists between the sixth signal and the driving signal S1. In one embodiment, the control apparatus may be a portion of the DC/DC converter to control the operation the DC/DC converter.

The first secondary side control module 82 is used for implementing the sixth signal, the fifth signal, the seventh signal and the eighth signal to act as the secondary side driving signals to drive the sixth switch, the fifth switch, the seventh switch and the eighth switch, respectively. The second secondary side control module 83 is used for proving the sixth signal, the fifth signal, the seventh signal and the eighth signal to act as the intermediate signals, generating the secondary side driving signals according to at least one of the primary side driving signals and the intermediate signals, and applying the generated secondary side driving signals to drive the corresponding secondary side switches, respectively.

The control apparatus for the DC/DC converter provided in the present embodiment may execute the method embodiments shown in FIGS. 4, 5, 7, 9, 10, 15 and 20.

Embodiment 9

Figure 22:
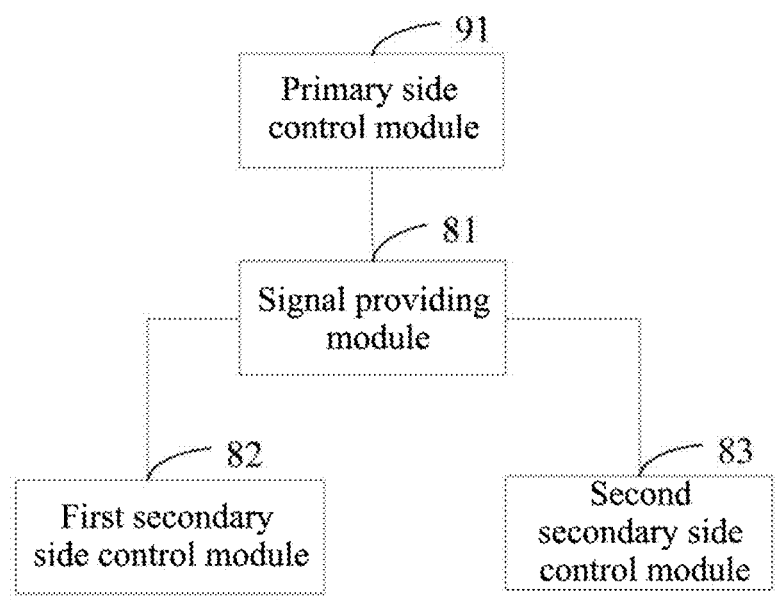
FIG. 22 is a block diagram of a control apparatus for controlling a DC/DC converter according to Embodiment 9 of the disclosure.

FIG. 22 is a block diagram of a control apparatus for controlling a DC/DC converter according to Embodiment 9 of the disclosure. As shown in FIG. 22, the control apparatus for controlling the DC/DC converter provided in the present embodiment, besides the modules illustrated in the DC/DC converter provided in Embodiment 8, further includes: a primary side control module 91.

Preferably, the DC/DC converter is a bidirectional DC/DC converter. The DC/DC converter further includes a resonant tank including a transformer.

Further, the primary side control module 91 provides the first primary side driving signal to drive the second switch SW2 and the third switch SW3, and provides the second primary side driving signal to drive the first switch SW1 and the fourth switch SW4. The first primary side driving signal is complementary to the second primary side driving signal.

Optionally, in the present embodiment, the sixth signal, the fifth signal, the seventh signal and the eighth signal in turn exist a phase-lag by a predetermined phase difference.

Optionally, in the present embodiment, the sixth signal, the fifth signal, the seventh signal and the eighth signal in turn exist a phase-lead by a predetermined phase difference.

Preferably, in the present embodiment, the duty cycle of the secondary side driving signals is 25%, and the predetermine phase difference may be 90 degrees.

Optionally, the second secondary side control module 83 is used for applying a digital computing operation or logic gate operation to the at least one primary side driving signal and the intermediate signals to generate the secondary side driving signals so as to operate the DC/DC converter in an asynchronous rectification state or a synchronous rectification state.

Further, in the present embodiment, the sixth signal is provided as the first intermediate signal, the fifth signal is provided as the second intermediate signal, the seventh signal is provided as the third intermediate signal, and the eighth signal is provided as the fourth intermediate signal.

Correspondingly, the second secondary side control module 83 may be implemented to perform the digital computing method or a logic operation as described in Embodiment 5 and drawings of FIGS. 10~14 to generate the secondary side driving signals. The second secondary side control module 83 may be implemented to perform the digital computing method or logic gate operations as described in Embodiment 6 and drawings of FIGS. 15~19 to generate the secondary side driving signals. Or, the second secondary side control module 83 may be implemented to perform the digital computing method or logic gate operations as described in Embodiment 7 and drawings of FIG. 20 to generate the secondary side driving signals.

The control apparatus of the DC/DC converter provided in the present embodiment may execute the control methods of Embodiments 1 to 7, and implementation principle and technical effect thereof are similar, which will not be repeated herein.

In the embodiments provided in the disclosure, it should be understood that the disclosed apparatus and method may be implemented in other modes. For example, the apparatus embodiments described above are only illustrative. For example, the division of modules is only a logical function division, and there may be other division modes in actual implementation, for example, multiple modules or components may be combined or integrated into another system, or some features may be omitted or not be executed. In addition, displayed or discussed mutual coupling, direct coupling, or a communication connection may be indirect coupling or communication connection through some interfaces, apparatuses, or modules, and may be electrical, mechanical or other forms.

The modules illustrated as separate components may or may not be physically separated, and the components displayed as modules may or may not be physical modules, that is, they may be located in one place, or may be distributed on multiple network modules. Some or all of the modules may be selected to achieve the purpose of the solution of the embodiments according to actual demands.

In addition, various functional modules in various embodiments of the disclosure may be integrated into one processing module, or each module may exist separately and physically, or two or more modules may be integrated into one module. The integrated modules above may be implemented in the form of hardware or in the form of hardware plus software functional modules.

The program code for implementing the method of the disclosure may be written in any combination of one or more programming languages. The program codes may be provided to a processor or controller of a general purpose computer, a special purpose computer, or other programmable data processing apparatus, such that the program codes, when executed by the processor or controller, cause the functions/the operations specified in the flowchart and/or the block diagram to be implemented. The program codes may be executed entirely on a machine, partially on the machine, partially on the machine as a stand-alone software package and partially on a remote machine or entirely on a remote machine or server.

In the context of the disclosure, a machine readable medium may be a tangible medium that may contain or store a program for use by or in connection with an instruction execution system, an apparatus, or a device. The machine readable medium may be a machine readable signal medium or a machine readable storage medium. A machine readable media may include, but is not limited to, an electronic, a magnetic, an optical, an electromagnetic, an infrared, or a semiconductor system, device, or apparatus, or any suitable combination of the foregoing. More specific examples of machine readable storage media may include electrical connections based on one or more wires, a portable computer disk, a hard disk, a random access memory (RAM), a read only memory (ROM), an erasable programmable read only memory (EPROM or flash memory), optical fiber, portable compact disk read only memory (CD-ROM), optical storage device, magnetic storage device, or any suitable combination of the foregoing.

In addition, although the operations are depicted in a particular order, it should be understood that such operations are required to be performed in that particular order shown or in sequential order, or that all illustrated operations should be performed to achieve the desired results. In certain circumstances, multitasking and parallel processing may be advantageous. Likewise, although several specific implementation details have been included in the above discussion, these should not be interpreted as limiting the scope. Certain features that are described in the context of separate embodiments may also be implemented in combination in a single embodiment. Conversely, various features that are described in the context of a single implementation may also be implemented in multiple implementation s separately or in any suitable sub-combination.

Although the subject matter has been described in language specific to structural features and/or methodological acts, it should be understood that the subject matter defined in the appended claims is not necessarily limited to the specific features or acts described above. Rather, the specific features and acts described above are merely exemplary forms of implementing the claims.

What is claimed is:

1. A control method for a DC/DC converter, the DC/DC converter comprising a primary side circuit and a secondary side circuit electrically isolated with each other, wherein the secondary circuit comprises a first secondary side bridge arm consisting of a fifth switch and a sixth switch in series, and a second secondary side bridge arm consisting of a seventh switch and an eighth switch in series, and the first secondary side bridge arm is parallel to the second secondary side bridge arm, the method comprising:
   providing a primary side driving signal to drive one or more primary side switches of the primary side circuit;
   providing a sixth signal, a fifth signal, a seventh signal and an eighth signal, wherein a phase shift angle exists between the sixth signal and the primary side driving signal, and the sixth signal, the fifth signal, the seventh signal and the eighth signal in turn have a predetermined phase difference;
   driving the sixth switch, the fifth switch, the seventh switch and the eighth switch according to the sixth signal, the fifth signal, the seventh signal and the eighth signal, respectively;
   wherein the switching frequency of the sixth signal, the fifth signal, the seventh signal or the eighth signal is half of the switching frequency of the primary side driving signal.

2. The control method according to claim 1, wherein the DC/DC converter is a bidirectional converter.

3. The control method according to claim 1, wherein the DC/DC converter further comprises a resonant tank, and the resonant tank comprises a transformer.

4. The control method according to claim 1, wherein the step of driving the sixth switch, the fifth switch, the seventh switch and the eighth switch further comprises:
   providing the sixth signal to act as a six secondary side driving signal to drive the sixth switch;
   providing the fifth signal to act as a fifth secondary side driving signal to drive the fifth switch;
   providing the seventh signal to act as a seventh secondary side driving signal to drive the seventh switch; and
   providing the eighth signal to act as an eighth secondary side driving signal to drive the eighth switch.

5. The control method according to claim 1, wherein the step of driving the sixth switch, the fifth switch, the seventh switch and the eighth switch further comprises:
   providing the sixth signal, the fifth signal, the seventh signal and the eighth signal as intermediate signals;
   generating secondary side driving signals according to the primary side driving signal and the intermediate signals; and
   driving the sixth switch, the fifth switch, the seventh switch and the eighth switch by the generated secondary side driving signals.

6. The control method according to claim 5, wherein the generated secondary side driving signals operates the DC/DC converter in an asynchronous rectification state or a synchronous rectification state.

7. The control method according to claim 5, wherein the step of generating secondary side driving signals according to the primary side driving signal and the intermediate signals further comprises:
   performing digital computing or a logic gate operation to the primary side driving signal and the intermediate signals to generate the secondary side driving signals;
   wherein the logic gate operation comprises AND, OR, NAND, NOT or any combination thereof.

8. The control method according to claim 1, wherein the sixth signal, the fifth signal, the seventh signal and the eighth signal in turn have a phase-lag by the predetermine phase difference.

9. The control method according to claim 1, wherein the sixth signal, the fifth signal, the seventh signal and the eighth signal in turn have a phase-lead by the predetermine phase difference.

10. The control method according to claim 1, wherein a duty cycle of the sixth signal, the fifth signal, the seventh signal and the eighth signal is 25%, and the predetermined phase difference is 90°.

11. A DC/DC converter, comprising:
    a primary side circuit comprising a primary side switch which is driven by a primary side driving signal;
    a secondary side circuit, electrically isolated with the primary side circuit, comprising a first secondary side bridge arm consisting of a fifth switch and a sixth switch in series, and a second secondary side bridge arm consisting of a seventh switch and an eighth switch in series, wherein the first secondary side bridge arm is parallel to the second secondary side bridge arm; and
    a control apparatus comprising:

a primary side control module, configured to provide the primary side driving signal to drive one or more primary side switches of the primary side circuit;

a signal providing module, configured to provide a sixth signal, a fifth signal, a seventh signal and an eighth signal, wherein a phase shift angle exists between the sixth signal and the primary side driving signal; the sixth signal, the fifth signal, the seventh signal and the eighth signal in turn have a predetermined phase difference; and the switching frequency of the sixth signal, the fifth signal, the seventh signal or the eighth signal is half of the switching frequency of the primary side driving signal; and a secondary side control module, configured to generate secondary side driving signals to drive the sixth switch, the fifth switch, the seventh switch and the eighth switch according to the sixth signal, the fifth signal, the seventh signal and the eighth signal.

12. The DC/DC converter according to claim 11, wherein the DC/DC converter is a bidirectional converter.

13. The DC/DC converter according to claim 11, wherein the DC/DC converter further comprises a resonant tank, and the resonant tank comprises a transformer.

14. The DC/DC converter according to claim 11, wherein the secondary side control module is configured to receive the sixth signal, the fifth signal, the seventh signal and the eighth signal and is further configured to provide the sixth signal, the fifth signal, the seventh signal and the eighth signal to act as a six secondary side driving signal, a fifth secondary side driving signal, a seventh secondary side driving signal and an eighth secondary side driving signal so as to drive respectively the sixth switch, the fifth switch, the seventh switch and the eighth switch.

15. The DC/DC converter according to claim 11, wherein the secondary side control module is configured to receive the sixth signal, the fifth signal, the seventh signal and the eighth signal and is further configured to perform digital computing or a logic gate operation to the six signal, the fifth signal, the seventh signal, the eighth signal and the primary side driving signal to generate the secondary side driving signals so as to drive respectively the sixth switch, the fifth switch, the seventh switch and the eighth switch.

16. The DC/DC converter according to claim 15, wherein the generated secondary side driving signals operate the DC/DC converter in an asynchronous rectification state or a synchronous rectification state.

17. The DC/DC converter according to claim 15, wherein the logic gate operation comprises AND, OR, NAND, NOT or any combination thereof.

18. The DC/DC converter according to claim 11, wherein the sixth signal, the fifth signal, the seventh signal and the eighth signal in turn have a phase-lag by the predetermine phase difference.

19. The DC/DC converter according to claim 11, wherein the sixth signal, the fifth signal, the seventh signal and the eighth signal in turn have a phase-lead by the predetermine phase difference.

20. The DC/DC converter according to claim 11, wherein the duty cycle of the sixth signal, the fifth signal, the seventh signal and the eighth signal is 25%, and the predetermined phase difference is 90°.

* * * * *